(12) United States Patent
Puthamparambil Jayaraj

(10) Patent No.: US 12,333,167 B2
(45) Date of Patent: Jun. 17, 2025

(54) HOST INDEPENDENT FORMATTING OF STORAGE DEVICES

(71) Applicant: Sandisk Technologies, Inc., Milpitas, CA (US)

(72) Inventor: Prajual Puthamparambil Jayaraj, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/446,383

(22) Filed: Aug. 8, 2023

(65) Prior Publication Data

US 2024/0134547 A1 Apr. 25, 2024
US 2024/0231656 A9 Jul. 11, 2024

Related U.S. Application Data

(60) Provisional application No. 63/418,962, filed on Oct. 24, 2022.

(51) Int. Cl.
*G06F 3/06* (2006.01)

(52) U.S. Cl.
CPC .......... *G06F 3/0632* (2013.01); *G06F 3/0604* (2013.01); *G06F 3/0676* (2013.01); *G06F 3/0679* (2013.01); *G06F 2212/7204* (2013.01)

(58) Field of Classification Search
CPC .... G06F 3/0632; G06F 3/0604; G06F 3/0676; G06F 3/0679; G06F 2212/7204
See application file for complete search history.

(56) References Cited

U.S. PATENT DOCUMENTS

| | | | |
|---|---|---|---|
| 7,058,759 B1 | 6/2006 | Reiser et al. | |
| 7,228,379 B2 | 6/2007 | Bress et al. | |
| 11,163,442 B2 | 11/2021 | Mastenbrook et al. | |
| 2006/0117393 A1 | 6/2006 | Merry, Jr. et al. | |
| 2014/0163716 A1 | 6/2014 | Chang et al. | |
| 2022/0121454 A1* | 4/2022 | Nottingham | G06F 8/63 |

FOREIGN PATENT DOCUMENTS

| | | |
|---|---|---|
| KR | 20130032151 A | 4/2013 |
| WO | 2021118643 A1 | 6/2021 |

* cited by examiner

*Primary Examiner* — Kalpit Parikh
(74) *Attorney, Agent, or Firm* — PATTERSON + SHERIDAN, LLP

(57) ABSTRACT

A data storage device is enabled to independently self-format, without requiring a connected host device during the active formatting process. The storage device includes a data interface configured to receive power from the host device or a wall charger, non-volatile storage media, and control circuitry. The control circuitry is configured to receive first power from the host device, receive instructions from the host device to perform a format operation, save the instructions to perform the format operation, and cease receiving the first power from the host device. The control circuitry is further configured to receive second power from the wall charger and, in response to retrieving the saved instructions, initiate the format operation on the non-volatile storage media.

20 Claims, 4 Drawing Sheets

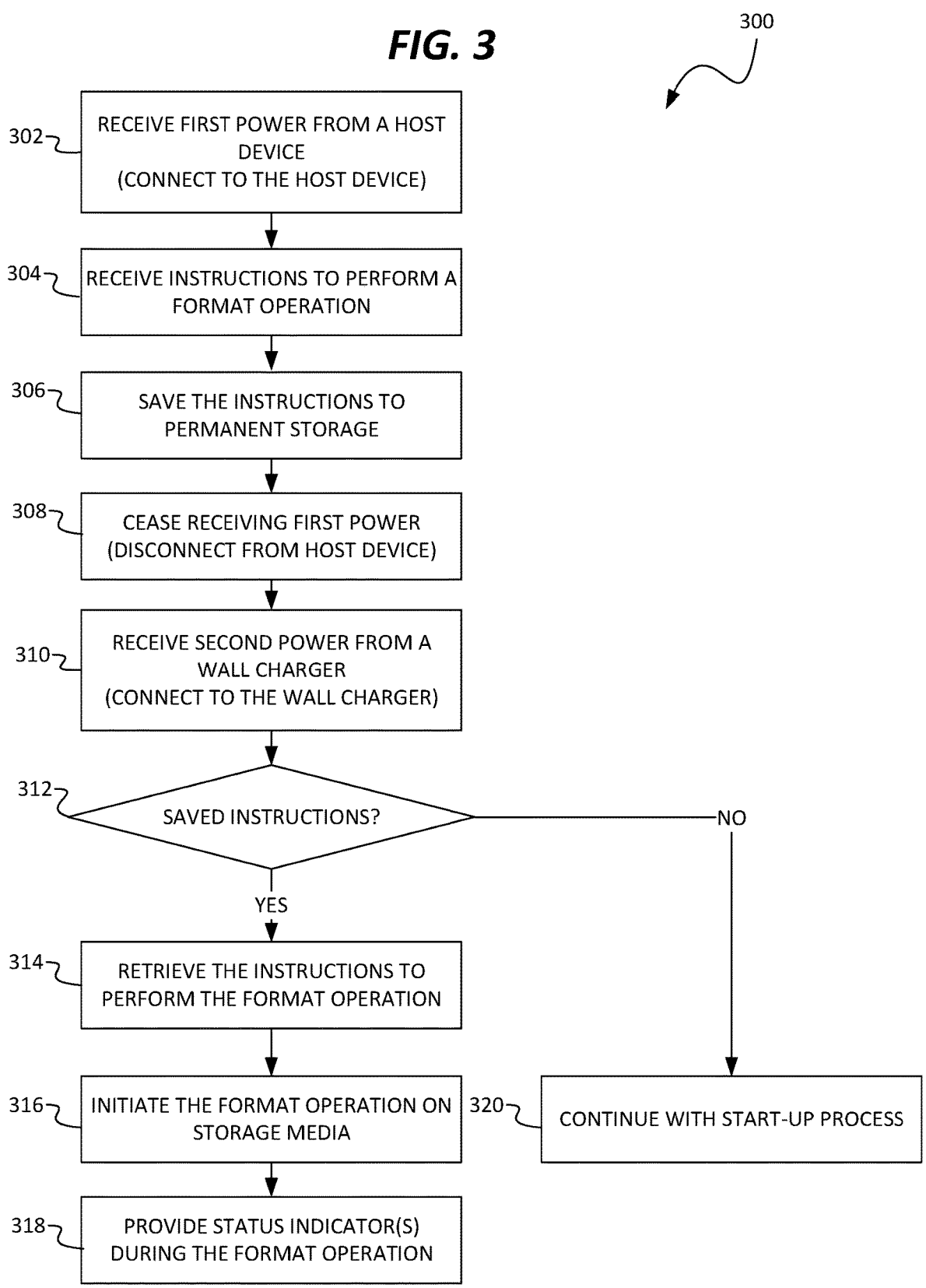

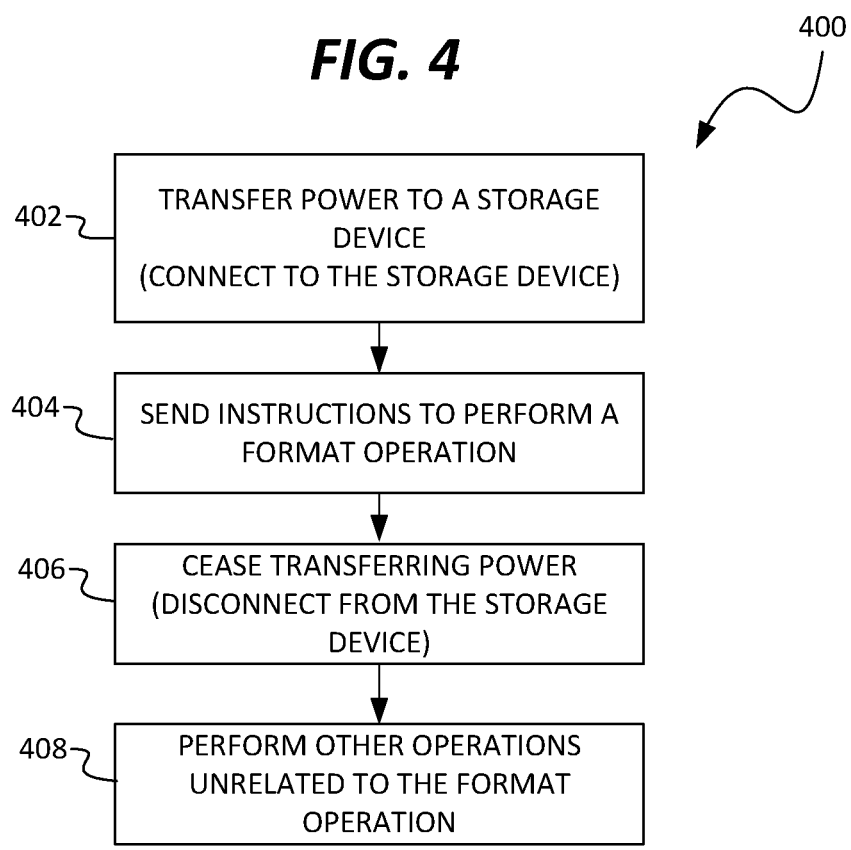

HOST INDEPENDENT FORMATTING OF STORAGE DEVICES

CROSS-REFERENCE TO RELATED APPLICATIONS

The present application claims priority to U.S. Provisional Patent Application Ser. No. 63/418,962, filed Oct. 24, 2022, entitled HOST INDEPENDENT FORMATTING OF STORAGE DEVICES, the disclosure of which is hereby incorporated by reference in its entirety.

BACKGROUND

Field

This disclosure relates to formatting of storage devices. More particularly, the disclosure relates to devices and methods for allowing independent formatting of storage devices.

Description of Related Art

Data storage devices typically need to be formatted prior to initial use. They may also be reformatted to deal with disk errors or to erase old data. Full formatting of data storage devices can include low-level formatting, partitioning, and high-level formatting.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 3 illustrates a block diagram representing a formatting process performed by a storage device, according to certain embodiments.

FIG. 4 illustrates a block diagram representing a formatting process for a host device, according to certain embodiments.

DETAILED DESCRIPTION

Figure 1:
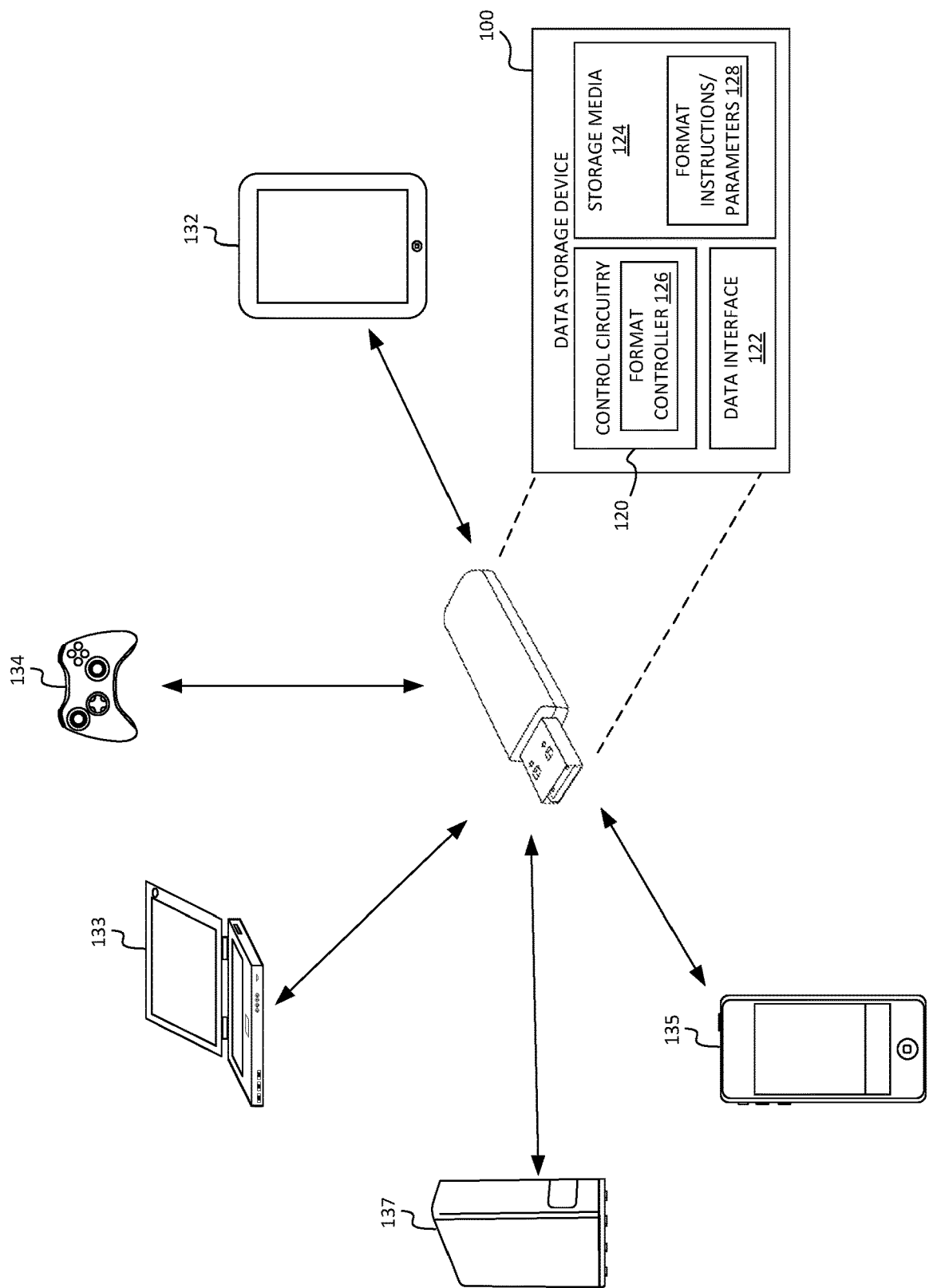
FIG. 1 is a diagram illustrating a data storage device that enables independent full formatting of the data storage device, without a connection to a host device during the formatting, according to certain embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Different types of operating systems may use different types of data formats for storing data. Some operating systems are only able to read from certain formats. Two different operating systems may not be able to read data stored in the data format used by the other operating system. Thus, data storage devices require initialization by formatting the storage device to a data format supported by the operating system that will be storing files on that storage device.

Operating systems may provide an option to perform a quick format or a full format (also called a normal format). A quick format typically takes several seconds while a full format can take several hours. During the quick format, the address location of the data stored in the storage device is erased, while the data itself is not touched. For example, the address locations may be stored in a file allocation table (FAT) that is erased during the quick format. Meanwhile, the full format erases the address location and also checks the storage device for bad sectors, which are then removed from use to prevent data corruption. As data storage devices grow to larger and larger sizes, with terabytes or more of available storage, full formats take longer and longer. For external storage devices that are plugged into a host device (also called a host system) for power, taking such a long time can prevent the host device from being used for other matters or can prevent the host system from being shut down.

In addition, using a full format can block the port on the host device that the storage device is connected to from being used by other devices. Some host devices, such as tablets or ultraportable laptops, may have only a few ports, thus, blocking the port for hours of time may greatly inconvenience a user. Furthermore, having the host device powered on while the storage device is connected can increase overall power consumption, since the host device is kept on even if the user is not using it for anything else. Also, the host device introduces an additional failure point for the formatting process. If the host device restarts or is otherwise interrupted, the full format operation on the storage device may fail and need to be restarted. In addition, if multiple storage devices need formatting, the formatting may need to be done serially if there are limited ports on the host device. This can increase the overall time needed to perform the formatting of the multiple storage devices.

One potential solution is to enable the data storage device to perform a full format independently of the host system. The data storage device is enabled to independently self-format, without requiring a connected host device during the active part of the formatting process. External storage devices typically lack input devices and batteries, requiring a connection (e.g., via a universal serial bus (USB) cable and interface) to the host system to obtain power and to receive commands from a user. For example, the external storage device can connect to the host device. The user can then, via the host system, send a formatting command to the storage device. The user can then use an input device and user interface of the host device to select a formatting command. The host device can then send the formatting command to the external storage device.

Rather than initiating the formatting immediately, the storage device can save the command to its non-volatile memory. The storage device can then power down. Afterwards, the user can disconnect the external storage device from the host system and connect it to a wall adapter, such as USB wall charger that connects to main power (e.g., via a 120-volt power outlet). Upon connection to the wall adapter, the external storage device can start-up, find the format command, and initiate formatting of its non-volatile memory. The external device can then proceed with formatting and then provide an indicator (e.g., flashing light emitting diodes (LEDs) or changing color of an LED) to the user that the formatting is complete. Meanwhile, the user is free to put the host device to other uses, or even turn it off.

Data Storage Device

FIG. 1 is a diagram illustrating a data storage device 100 that enables independent full formatting of the data storage device, without a connection to a host device during the formatting, according to certain embodiments. In some embodiments, the data storage device 100 includes control circuitry 120 for controlling the data storage device 100, a data interface 122, and non-volatile storage media 124. The control circuitry 120 can include hardware and/or software (e.g., firmware) for performing format operations on the storage media 124, such as a format controller 126. The format controller 126 may be implemented in firmware, which may be run on a controller chip. In some implementations, format controller 126 may be a specialized, hardware-based chip for performing format operations. The control circuitry 120 can also include additional functionality. For example, the control circuitry 120 may support file-based storage. The control circuitry 120 can also include functionally for managing data transfers of the data storage device.

In addition, the storage media 124 may be used to store format instructions 128 or commands that provide parameters for the format operations. The format instructions 128 may also include a flag (e.g., specific bit code) that indicates the format instructions 128 have been saved and that a format operation should be performed at startup. For example, during the startup process, the control circuitry 120 may check the flag to determine whether to initiate formatting of the storage media 124. If the flag is not set (e.g., "no," "0" or "off"), the control circuitry 120 can proceed with a normal startup operation, without performing any formatting operations. The format instructions may also include parameters for the formatting. Such parameters can include the file system, the block size, cluster size, etc. In some scenarios, no parameters may be saved or set by the user. The storage device 100 may then utilize default parameters for the format operation, such as pre-programmed default parameters set by the storage device manufacturer.

The data storage device 100 can employ a variety of storage technologies and/or form factors. For example, the data storage device 100 may be a solid-state drive (SSD), Secure Digital (SD) card, or a universal serial bus (USB) memory stick that uses semiconductor memory as the storage media 124. In other implementations, the data storage device 100 may be a hard disk drive (HDD) that uses magnetic disks as the storage media 124 or a solid-state hybrid drive (SSHD) that uses a combination of semiconductor memory and magnetic disk technology.

The storage media 124 can utilize various types of non-volatile memory (NVM) to permanently store data. NVM is a type of computer memory that can retain stored information even after power is removed. For example, the storage media 124 can include one or more magnetic disks and/or semiconductor memory. The semiconductor memory can include any of various memory technologies, such as NAND memory and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as ReRam, Phase-Change Memory (PCM), and Magnetoresistive Random-Access Memory (MRAM).

The data storage device 100 can include a small amount of volatile memory, such as random-access memory (RAM) to serve as a cache for data. Such a cache can enable very fast access to data stored on it. In some embodiments. The data storage device 100 can also include a secondary non-volatile memory, in addition to the storage media 124. For example, the data storage device 100 can also include read-only memory (ROM), where firmware may be stored, and/or complementary metal-oxide semiconductor (CMOS) memory, where firmware settings may be stored.

In some embodiments, the control circuitry 120 is configured to manage semiconductor memory or magnetic technology. For example, the control circuitry 120 may include a memory or storage controller. In some embodiments, the control circuitry 120 is configured to manage the data interface 122. For example, the control circuitry 120 may include a USB controller. The control circuitry 120 can include an embedded processor, electrically erasable firmware ROM, RAM, error correction code (ECC) circuitry, head controller, voice coil motor (VCM) controller, and/or a host electrical interface such as Serial ATA (SATA), USB, Non-Volatile Memory Express (NVMe), or Serial-Attached SCSI (SAS).

The data interface 122 can include connectors, cables, and/or protocols for connection, communication, and/or power supply between host devices and the data storage device 100. In some embodiments, a port of the data interface 122 can enable transfer of both data and power to connected devices. In some embodiments, the data interface 122 comprises USB hardware and/or software. Various versions of USB can be used, such as USB 2.x, USB 3.x, or USB 4.x. The data interface 122 can include a physical port for coupling with connectors and cables. Various types of USB ports can be included on the data storage device, such as male or female Type A, Type B, Type C, mini, and/or micro connectors. Other data interface standards can also be used, such as external SATA (eSATA), ExpressCard, FireWire (IEEE 1394), and Thunderbolt. The data interface 122 can include a port for connecting with a cable or a corresponding port on the host device.

In some embodiments, the data storage device 100 lacks a battery. Instead, the data storage device 100 receives power, via the data interface 122, from a connected host or via a wall adapter (e.g., USB charger) that can connect to mains electric power in a building. A USB port on the host device can provide both power and serve as a conduit for data transmission. For example, the data storage device 100 may connect via the USB port to the host system, which typically provides 5 volts of direct current (DC) power, though fast charging USB ports may provide higher voltages of DC power.

Various types of host devices can connect to the data storage device 100. Such host devices can include phones 135, such as smartphones, electronic appliances (not shown), smart televisions (TV's) (not shown), video game devices 134, laptop computers 133, tablet computers 132, desktop computers (not shown), wearable computers (not shown), wall-powered storage devices 137 (e.g., network attached storage or powered external drive) and/or other consumer electronic devices.

The data storage device 100 may be communicatively coupled to a host device via the data interface 122. The data storage device 100 may provide additional data storage to connected devices or facilitate transfer of data to other host devices. The data storage device 100 may be connected to a physical connection port (e.g., USB) on the host device, either directly (e.g., male port to female port) or via a cable.

Independent Formatting

Figure 2A:
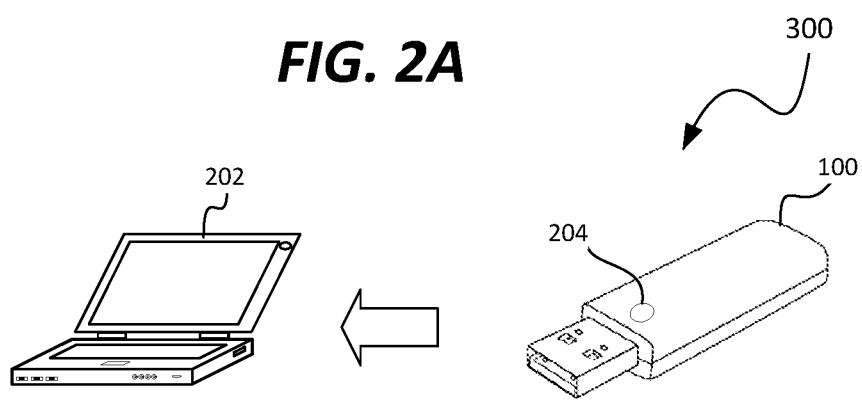
FIGS. 2A and 2B illustrate the data storage device being connected to a host device and then subsequently a wall adapter during a formatting process, according to certain embodiments.
Figure 2B:
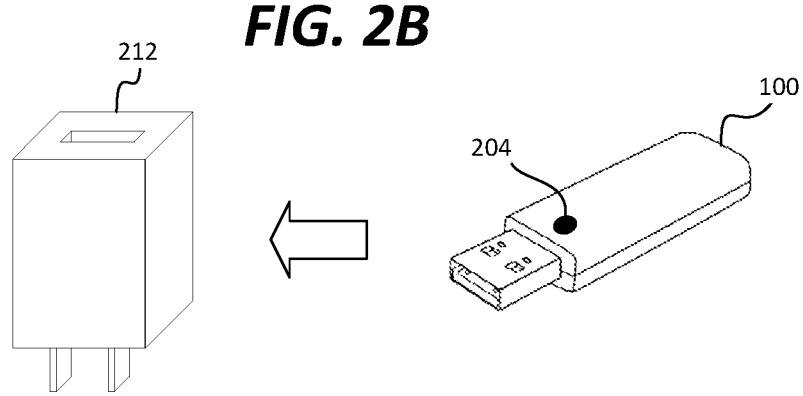

FIGS. 2A and 2B illustrate the data storage device 100 being connected to a host device and then subsequently a wall adapter during a formatting process, according to certain embodiments. In one scenario as shown in FIG. 2A, the storage device 100 is connected to a host device 202, such as a laptop or desktop computer. Other types of host devices, such as those described in FIG. 1, can also be used. The host device 202 can include input (e.g., keyboard, mouse, touchpad, touchscreen, etc.) devices and a display, enabling a user to initiate and configure a formatting process for the storage device 100. After selecting the desired parameters for the formatting, the format command and associated parameters can be saved by the storage device 100 to its non-volatile memory, which may be the storage media 124, a CMOS, or other type of permanent storage.

For example, the data storage device 100 may be a USB memory stick electrically and physically coupled to a USB port of the host device 202. The data interface 122 enables data, including commands, to be transmitted from the host device to the data storage device 100 and vice versa. It may also provide power to the data storage device 100. A user may then initiate a data transfer from the host device. Data is then received via the data interface 122 of the data storage device 100. The data can include one or more formatting commands and associated parameters.

The format controller 126 can receive the data (e.g., format command) from the data interface 122. The format controller 126 can then perform various operations in preparation for performing a format operation on the storage media 124 of the data storage device 100. For example, the format controller 126 can save the format instructions/parameters 128 to permanent storage, such as the storage media 124. The format controller 126 may also set a flag or other indicator that a format operation is ready to proceed at the next startup. The format controller 126 may then shut down the storage device 100, either on its own or in response to further instructions from the user.

After shutting down the storage device 100, the user can physically disconnect the storage device from the host device 202 and physically connect it to a wall charger 212 that can provide power to the storage device 100. In one embodiment, the wall charger 212 is a USB charger that includes a USB port for charging USB devices. In another embodiment, the wall charger 212 is an AC adapter that connects to a power port on the data storage device 100. For example, the storage device 100 may be a powered external storage drive that lacks a battery, but obtains power from a wall outlet in a building.

The storage device 100 can then power on. While powering on, it can check the indicator to determine whether it should perform a format operation. Assuming the format operation is called for, the storage device 100 can retrieve the saved format instructions/parameters 128. The format controller 126 can then initiate the format operation based on the format instructions/parameters 128.

As the formatting of the drive is happening without requiring the host device 202, the user may freely utilize the host device 202. For example, the user may turn off the host device 202 without affecting the formatting of the data storage device 100. In contrast, if the data storage device 100 were connected and/or receiving power from the host device 202 during formatting, turning off the host device 202 may interrupt the formatting or otherwise cause it to fail. For example, formatting a data storage device is typically initiated and performed by the host device 202. Thus, changes (e.g., shutting down, restarting, program crashes, etc.) to the host device 202 can cause the formatting to fail. However, by making the actual formatting independent of the host device 202, that removes a potential source of failure in the formatting process.

Full formatting of the data storage device 100 can include multiple steps, such as low-level formatting, partitioning, and high-level formatting. Formatting prepares the data storage device for initial use and can be used for various types of data storage devices, such as HDDs, SSDs, floppy disks, memory cards, USB flash drives, and the like. Low-level formatting can include reinitializing the data storage device to its factory configuration. It may also include overwriting every byte of data (e.g., writing zeroes to the storage media) and/or checking for damaged sectors or bad blocks. Partitioning of the data storage device 100 can include writing information to the storage device to divide the device into one or more sub-devices or partitions, each of which can be treated by the operating system as a separate storage device. For example, partitioning may create a reserve partition where non-user data, such as saved instructions/commands and parameters, may be stored. The partitioning process can also include designating and configuring a partition as a boot drive for the operating system. High-level formatting can include generating and/or setting up a new file system on a disk partition or a logical volume and can also include installing a boot sector. In contrast, a quick formatting process may include only the high-level formatting and not the low-level formatting and the partitioning.

The storage device 100 can use one or more indicators 204 to provide status information to the user. The indicators may be one or more light emitting diodes (LED), a screen, an electrochromic display, or the like. In one scenario, the indicator is off most of the time (as shown in FIG. 2A), but lights up when the format operation is completed (as shown in FIG. 2B). In other scenarios, the indicator may use multiple colors to indicate different statuses. For example, Table 1 below shows one implementation that uses a first color to indicate 0-50% complete or 50%-99%, and a second color to indicate completion. In one example, color 1 is red and color 2 is green. Other colors can also be used. Table 1 also describes an implementation that uses LED blink rates to indicate completion percentage. For example, an LED blinking every 5 seconds can indicate 0-50% complete, the LED blinking every 10 seconds indicates 50%-99% complete, and the LED blinking every 2 seconds indicates completion of the formatting operation. The LED colors and the LED blink rate can be implemented separately or together. For example, color 1 blinking every 5 seconds indicates 0-50% complete, color 1 blinking every 5 seconds indicates 50%-99% complete, and color 2 blinking every 2 seconds indicates completion of the formatting process.

TABLE 1

| Full Format Completion Percentage | HDD LED Indicator State | |
|---|---|---|
| | LED Color | LED Blink rate |
| 0% to 50% | Color 1 | Every 5 seconds |
| 50% to 99% | Color 1 | Every 10 seconds |
| On Completion | Color 2 | Every 2 seconds |

Formatting Process

FIG. 3 illustrates a block diagram representing a formatting process 300 performed by a storage device, according to certain embodiments. For ease of reference, the following discusses the deduplication process in reference to the data storage device 100 of FIGS. 1-2B and the host device 202 of FIGS. 2A-2B, though it can work with other types of storage devices and host devices.

At block 302, the storage device 100 receives first power from the host device 202. The user may connect a data interface 122 of the storage device 100 to a data port on the host device. The data port may also provide power to the data interface. For example, the storage device may be connected by a USB cable or USB connector to a corresponding USB port on the host device.

In some scenarios, the storage device 100 may receive power from a source other than the host device. In one scenario, the storage device 100 is a wall-powered storage device 137. For example, the storage device 100 may connect to a wall adapter to receive power while connected to the host device to receive data. However, for purposes of this scenario, the process 300 is described in terms of a storage device 100 without a battery that receives power directly from the host device when connected to it.

At block 304, the storage device 100 receives instructions to perform a format operation. For example, a user may use an operating system or program on the host device to send a command to the storage device 100 to perform the format operation. The format operation may be to perform a full format of the storage device 100. The user may also select parameters for the format operation, such as a block size, a cluster size, a file system type, whether to zero out the data, or the like.

At block 306, the storage device 100 saves the instructions to permanent storage. The instructions may be saved to the non-volatile storage media 124. In some implementations, the instructions may be saved to CMOS or a reserve partition in the storage media 124. Parameters for the format operation may also be saved to the same permanent storage as the instructions. In some implementations, a flag may be set to indicate that instructions have been saved, making it easier for the storage device 100 to determine that format instructions are available.

At block 308, the storage device 100 ceases receiving first power. For example, the storage device may be disconnected from the host device 202. The user may eject the storage device 100 from the host device 202, using the operating system of the host device. During ejection, the storage device 100 can write any data in its cache to its storage media 124 to ensure permeant storage of the data. The storage device 100 can then indicate to the host device 202 that it is ready to be disconnected from the host device. In one scenario, a USB connector of the storage device is removed from a USB port of the host device. Embodiments of the storage device 100 without a battery would then be unpowered.

At block 310, the storage device 100 receives second power from a wall charger. For example, after disconnecting the storage device 100 from the host device, the user can connect the storage device 100 to a wall charger. In one scenario, the wall charger has a USB charging port and the USB connector of the storage device 100 is connected to the USB charging port.

At block 312, the storage device 100 determines if instructions for performing a format operation have been saved. If instructions are found, then the process proceeds to block 314 to perform the format operation. If instructions are not found, then the process 300 proceeds to block 320 to perform a regular startup process without performing a format operation. The storage device 100 may determine that instructions are saved by checking that a flag has been set that indicates instructions are available. In some implementations, the storage device may store instructions in a specific memory location and can then determine that instructions are available by checking if the particular memory location has data stored in it.

At block 314, the storage device 100 retrieves the instructions to perform the format operation. The storage device 100 may also retrieve parameters for the format operation to customize the format operation. For example, the user may have selected particular settings for the format operation, such as the type of format operation (e.g., full, quick), the file system type, cluster size, whether to zero out data, whether to check for errors, or other options.

At block 316, the storage device 100 initiates the format operation on its storage media 124 using the saved instructions and, if available, the saved parameters. The storage media may be a disk media, NAND memory, or other type of non-volatile storage. In some embodiments, the format operation is a full format operation that includes checking the storage media for errors. The full format can also include setting up a file system on the storage device. The formatting operation may take up to a few hours.

At block 318, the storage device 100 provides one or more status indicators during the format operation. The storage device may use LEDs to provide the status to the user. For example, the indicator may light up, change to a specific color, or blink in a particular frequency or pattern to indicate that the format process is complete. The process 300 can then end.

Going back to block 312 where no instructions are saved, the process proceeds to block 320. At block 320, the storage device 100 continues with the start-up process. For example, the storage device 100 may initialize its storage media 124 and data interface 122 in preparation for transferring data to another device. The process 300 can then end.

FIG. 4 illustrates a block diagram representing a formatting process 400 for a host device 202, according to certain embodiments. For ease of reference, the following discusses the deduplication process in reference to the data storage device 100 of FIGS. 1-2B and the host device 202 of FIGS. 2A-2B, though it can work with other types of storage devices and host devices.

At block 402, the host device 202 transfers power to a storage device. For example, the storage device 100 may be connected by a USB cable or USB connector to a corresponding USB port on the host device. The host device 202 can transfer power and/or data over the USB connection. Other types of data/power interfaces can also be used, such as Thunderbolt.

At block 404, the host device 202 sends instructions to perform a format operation to the storage device 100. The instructions may include parameters that select particular options for the formatting, such as those described in earlier figures.

At block 406, the host device 202 ceases transferring power to the storage device 100. In one scenario, the user may disconnect the storage device 100 from the host device, for example, by removing a USB connector or USB cable from a port of the host device 202.

At block 408, the host device 202 is free to perform other operations unrelated to the format operation. As the storage device 100 is handling the formatting operation by itself, the host device is no longer involved and may perform other work or even shut down without affecting the format operation happening at the storage device 100. The process 400 can then end.

Additional Embodiments

Those skilled in the art will appreciate that in some embodiments, other types of data storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

For example, while the above has generally discussed the data storage device 100 in terms of an external storage device, the formatting process may also be implemented with internal storage drives that are installed within a computer case and connected directly to a motherboard via a storage interface, such as SATA or NVMe. Such internal drives may be adapted to include a format controller 126 to enable independent formatting. After issuing a formatting command to these internal drives, the drives can then be disconnected from the motherboard, removed from the case, and connected to a wall charger via an adapter (e.g., SATA or NVMe). The internal drives may then perform an independent format while disconnected from the motherboard of its host system.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device comprising:
    a data interface configured to receive power from a host device or a wall charger;
    non-volatile storage media; and
    control circuitry configured to perform the following in order:
        receive first power from the host device;
        receive instructions from the host device to perform a format operation;
        save the instructions to perform the format operation;
        receive second power from the wall charger after ceasing to receive the first power from the host device; and
        in response to retrieving the saved instructions, initiate the format operation on the non-volatile storage media.

2. The data storage device of claim 1, wherein the data storage device lacks a battery and operates only on power received from the host device or the wall charger.

3. The data storage device of claim 2, wherein the format operation further comprises a low-level formatting of the non-volatile storage media.

4. The data storage device of claim 3, wherein the format operation further comprises partitioning the non-volatile storage media and generating a new file system for the non-volatile storage media.

5. The data storage device of claim 1, wherein the control circuitry is further configured to:
    power down the data storage device after saving the instructions to perform the format operation and before receiving the second power from the wall charger.

6. The data storage device of claim 1, wherein the data storage device is physically disconnected from the host device and physically connected to the wall charger prior to initiating the format operation.

7. The data storage device of claim 1, wherein the instructions comprise command parameters for the format operation.

8. The data storage device of claim 7, wherein the control circuitry is further configured to, after receiving the second power from the wall charger:
    determine that saved instructions for the format operation are stored in the non- volatile storage media;
    retrieve the saved instructions; and
    generate a command for initiating the format operation from parameters in the instructions.

9. The data storage device of claim 1, wherein the control circuitry is further configured to perform a full format of the non-volatile storage media.

10. The data storage device of claim 1, wherein the non-volatile storage media comprises NAND flash memory.

11. The data storage device of claim 1, wherein the non-volatile storage media comprises magnetic disk media.

12. The data storage device of claim 1, wherein the data interface comprises a Universal Serial Bus (USB) interface.

13. A method for formatting a data storage device while disconnected from a host device during a format operation, the method comprising:
    receiving first power from the host device, the host device connected to a data interface of the data storage device;
    receiving instructions from the host device to perform a format operation;
    saving the instructions to perform the format operation on the data storage device;
    receiving second power from a wall charger in response to ceasing to receive the first power from the host device in response to the host device disconnecting the data storage device; and
    in response to retrieving the saved instructions, initiating the format operation on a non-volatile storage media of the data storage device.

14. The method of claim 13, wherein the data storage device lacks a battery and operates only on power received from the host device or the wall charger.

15. The method of claim 13, wherein performing the format operation comprises:
- performing a low-level formatting of the non-volatile storage media;
- partitioning the non-volatile storage media; and
- generating a new file system for the non-volatile storage media.

16. The method of claim 13, further comprising:
- powering down the data storage device after saving the instructions to perform the format operation and before receiving the second power from the wall charger.

17. The method of claim 13, further comprising:
- after receiving the second power from the wall charger, determining that saved instructions for the format operation are stored in the non-volatile storage media;
- retrieving the saved instructions; and
- generating a command for initiating the format operation from parameters in the instructions.

18. The method of claim 13, further comprising to performing a full format of the non-volatile storage media as part of the format operation.

19. The method of claim 13, wherein the non-volatile storage media comprises NAND flash memory.

20. A data storage device comprising:
- means for receiving power from a host device or a wall charger;
- means for permanently storing data; and
- control circuitry configured to perform the following in order:
  - receive first power from the host device;
  - receive instructions from the host device to perform a format operation;
  - save the instructions to perform the format operation;
  - receive second power from the wall charger after ceasing to receive the first power from the host device; and
  - in response to retrieving the saved instructions, initiate the format operation on the means for permanently storing data.

* * * * *